(12) United States Patent  
Shewchuk

(10) Patent No.: US 8,386,932 B2  
(45) Date of Patent: Feb. 26, 2013

(54) METHOD FOR DISPLAYING DOCUMENT-BASED HELP WITH THE HELP SYSTEM FOR A PROCESSING APPLICATION

(75) Inventor: Steven Arthur Shewchuk, Victoria (CA)

(73) Assignee: International Business Machines Corporation, Armonk, NY (US)

( * ) Notice: Subject to any disclaimer, the term of this patent is extended or adjusted under 35 U.S.C. 154(b) by 1325 days.

(21) Appl. No.: 11/963,030

(22) Filed: Dec. 21, 2007

(65) Prior Publication Data

US 2009/0164900 A1 Jun. 25, 2009

(51) Int. Cl.
*G06F 3/00* (2006.01)
*G06F 3/048* (2006.01)

(52) U.S. Cl. .................. 715/714; 715/705; 715/708

(58) Field of Classification Search .................. 715/714, 715/705, 708
See application file for complete search history.

(56) References Cited

U.S. PATENT DOCUMENTS

| | | | |
|---|---|---|---|
| 4,992,972 A * | 2/1991 | Brooks et al. .................. 715/708 |
| 5,361,361 A | 11/1994 | Hickman et al. | |
| 6,247,066 B1 | 6/2001 | Tanaka | |
| 6,801,222 B1 | 10/2004 | Dunham et al. | |
| 7,024,658 B1 | 4/2006 | Cohen et al. | |
| 7,865,828 B1 * | 1/2011 | Hanson et al. .................. 715/705 |
| 2002/0147757 A1 | 10/2002 | Day et al. | |
| 2005/0154719 A1 | 7/2005 | Choudhary et al. | |
| 2005/0154986 A1 * | 7/2005 | Bartek et al. .................. 715/714 |
| 2006/0080607 A1 * | 4/2006 | Cohen et al. .................. 715/705 |
| 2006/0150151 A1 | 7/2006 | Dubinsky | |
| 2007/0220428 A1 * | 9/2007 | Kureshy et al. .................. 715/708 |

OTHER PUBLICATIONS

"XFDL Specification", IBM Corporation, IBM Workplace Forms, V2.7, First Ed., Mar. 2007, pp. 1-56.
Chase, "XForms tip: Using the help and hints events", IBM Technical Library On Line, Nov. 29, 2006, pp. 1-4.
McCarrick, "Introducing IBM Workplace Forms", IBM Technical Library Online, Dec. 6, 2005, pp. 1-9.
PCT Search Report and Written Opinion Aug. 3, 2009.

* cited by examiner

*Primary Examiner* — Weilun Lo
*Assistant Examiner* — Truc Chuong
(74) *Attorney, Agent, or Firm* — Yee & Associates P.C.; Yeen Tham

(57) ABSTRACT

A computer-implemented method for integrating help functions. A compound document is received. The compound document comprises a help module. The help module comprises a first collection of help information that applies specifically to the compound document. The compound document is associated with a processing application used to manipulate the compound document. The processing application comprises application help. The application help comprises a second collection of help information that applies to the processing application. The first collection of help information is distinct from the second collection of help information. The method also includes integrating the help module into the application help to form a modified help. The modified help comprises a combination of the first collection of help information and the second collection of help information. The modified help can be stored or displayed.

25 Claims, 4 Drawing Sheets

```
<documenthelp xmins="www.ibm.com/documenthelp/1.0">
    <helppage>
        <title>First Help Page</title>
        <index>first, page</index>
        <content>This is the first help page</content>
        <helppage>
            <title>Child Page</title>
            <index>sub</index>
            <content>This is a child page of the first page.</content>
        </helppage>
    <helppage>
</documenthelp>
```

FIG. 7
```
<documenthelp xmlns="www.ibm.com/documenthelp/1.0">
    <position>before</position>
    <anchor>book1</anchor>
</documenthelp>
```

FIG. 8
```
<documenthelp xmlns="www.ibm.com/documenthelp/1.0">

<position>before</position>

<anchor>book1</anchor>

<helppage>
    ...
    </helppage>

<helppage>

<position>after</position>

<anchor>book3</anchor>
        ...

</helppage>
</documenthelp>
```

METHOD FOR DISPLAYING DOCUMENT-BASED HELP WITH THE HELP SYSTEM FOR A PROCESSING APPLICATION

BACKGROUND OF THE INVENTION

1. Field of the Invention

The present invention relates to an improved data processing system and, more particularly, towards an improved help system for applications and documents. Still more particularly, the present invention is directed towards an improved use of help information present in compound documents.

2. Description of the Related Art

With the growth of markup languages, such as the extensible markup language (XML), increasing usage of compound documents has been observed. A compound document is a document associated with a processing application, but wherein the compound document itself includes code to execute some functionality. For example, a particular document for a word processor may contain code or functionality to perform mathematical functions based on input placed into the compound document through the processing application. In another example, the compound document may include code to change what fields are displayed in a compound document while the compound document is being used or processed through the processing application. In still another example, a compound document may include one or more macros that can be executed while the compound document is open in the processing application.

A compound document can also be a document that collects several documents into one document. This type of compound document is frequently seen in XML documents, which use namespace to separate content for different purposes. For example, an XML document may contain data in one namespace that constitutes a business form, data in a second namespace that constitutes an instruction sheet for the form, and data in a third namespace that provides back-end processing information for the data in the form.

Thus, compound documents can be displayed or processed by a processing application similar to the way that a web browser displays hypertext markup language documents. These compound documents still use a viewing or processing application, but compound documents contain added functionality.

In a specific example, an extensible forms description language (XFDL) form can be displayed using the workplace forms viewer provided by International Business Machines Corporation of Armonk, N.Y. However, the XFDL form itself contains complicated functionality. The form itself can contain mathematical operations similar to a spreadsheet, and can react to user input by making sections of the form appear and disappear or by changing the workflow that the user follows when completing the form.

A problem that can arise with respect to compound documents is that the complexity of the compound document itself might lead to the creator of the compound document creating a help module for the compound document. A help module is a collection of help information that is defined within a document, and that applies specifically to that document.

Unfortunately, such help modules are not integrated with existing application help. Application help is the help system that comes with the processing application. Thus, two separate help systems exist and possibly can be active while a user is working with a compound document in a processing application. Because two separate help systems exist, a user can become confused as to whether or not the user is referring to a help module or to the application help. Additionally, a user may mistakenly attempt to access application help when the help module would be more appropriate, or conversely may mistakenly attempt to use the help module when the application help would be more appropriate.

SUMMARY OF THE INVENTION

The illustrative embodiments provide for a computer-implemented method, computer program product, and data processing system for integrating help functions. A compound document is received. The compound document comprises a help module. The help module comprises a first collection of help information that applies specifically to the compound document. The compound document is associated with a processing application used to manipulate the compound document. The processing application comprises application help. The application help comprises a second collection of help information that applies to the processing application. The first collection of help information is distinct from the second collection of help information. The method also includes integrating the help module into the application help to form a modified help. The modified help comprises a combination of the first collection of help information and the second collection of help information. The modified help can be stored or displayed.

In another illustrative embodiment, the help module is written in a markup language. In this case, the computer-implemented method further comprises parsing the compound document to extract the help module. The processing application can perform parsing and integrating. However, a plug-in module associated with the processing application performs can also perform parsing and integrating. Similarly, parsing and integrating can be performed during runtime by the processing application when the compound document is opened with the processing application.

The illustrative embodiments also include, responsive to a user request for help relating to the compound document, displaying the modified help.

In another illustrative embodiment, the help module comprises a first book comprising a first part of the first collection of help information. In this case, as part of integrating, the first book is placed into the application help at a pre-determined location. The pre-determined location can be specified by code contained within the help module. The pre-determined location can be a location associated with a second book, wherein the second book is associated only with the application help. The pre-determined location can also be a location between the second book and a third book associated only with the application help.

In yet another illustrative embodiment, placing can comprise one of inserting the first book before the pre-determined location, inserting the first book after the pre-determined location, inserting a specific portion of the first book at the predetermined location, wherein the specific portion is less than all of the first book, and replacing a part of the second collection of information, wherein the part comprises information associated with the pre-determined location. Additionally, the help module can further comprise a second book comprising a second part of the first collection of help information. In this case, as part of integrating, the second book is placed into the application help at a second pre-determined location. The second pre-determined location is different than the first pre-determined location.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 shows pseudo code that illustrates an exemplary method of integrating a portion of a help module into a specific place within application help, in accordance with an illustrative embodiment; and FIG. 8 shows pseudo code that illustrates an exemplary method of integrating a portion of a help module into a specific place within application help, in accordance with an illustrative embodiment.

DETAILED DESCRIPTION OF THE PREFERRED EMBODIMENT

Figure 1:
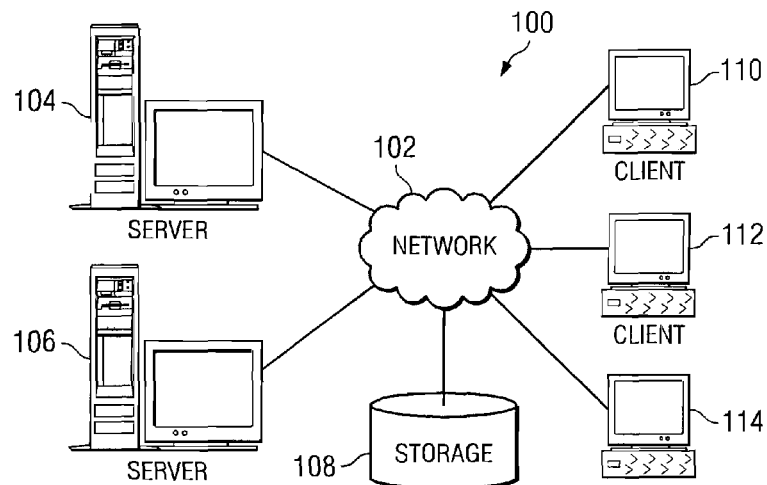
FIG. 1 shows a data processing system in which the illustrative embodiments may be implemented.
Figure 2:
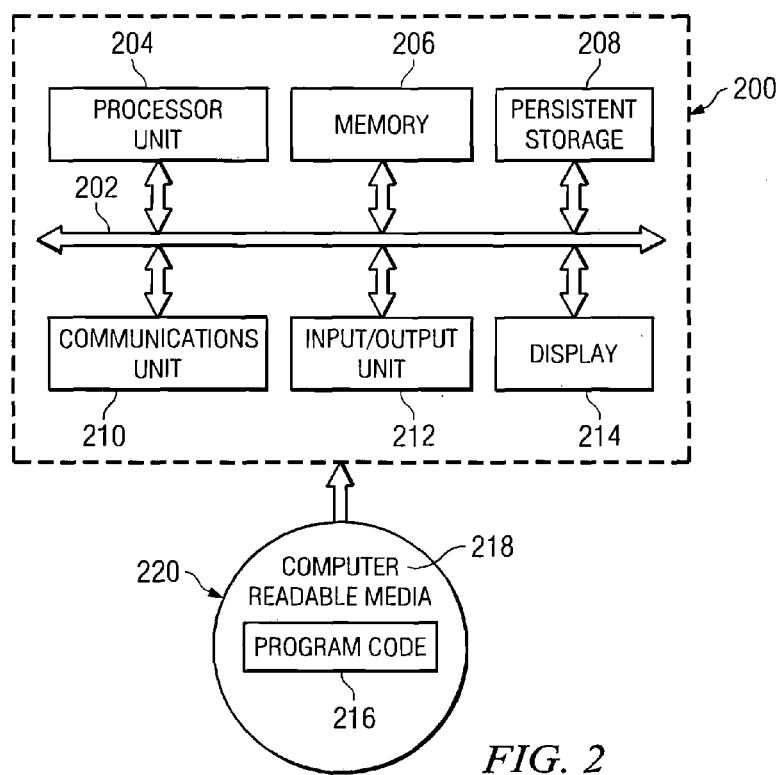
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 shows a data processing system in which the illustrative embodiments may be implemented. FIG. 1 also shows a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is a block diagram of a data processing system, in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments provide for embedding help information contained in compound documents into existing application help. In an illustrative embodiment, the help module is defined or described in the compound document through the use of a markup language, such as the extensible markup language (XML). In an illustrative embodiment, the processing application can parse this additional help information defined or expressed in the markup language, and combine this additional help information into the existing help of the application. In this manner, a single unified help system is created with respect to use of the particular specific compound document.

Optionally, a plug-in or framework can be provided with processing application. The plug-in or framework is used by the processing application to extract the help information from the compound document and to incorporate the help information into the application help.

Thus, the illustrative embodiments provide for a computer implemented method, computer program product, and data processing system for integrating help functions. A compound document is received. The compound document comprises the help module. The help module comprises a first collection of help information that applies specifically to the compound document. The compound document is associated with a processing application used to manipulate the compound document. The processing application comprises application help. The application help comprises a second collection of help information that applies to the processing application. The first collection of help information is distinct from the second collection of help information. The method also includes integrating the help module into the application help performed in modified help. The modified help comprises a combination of first collection of help information and the second collection of help information. The modified help can be stored or displayed.

Figure 3:
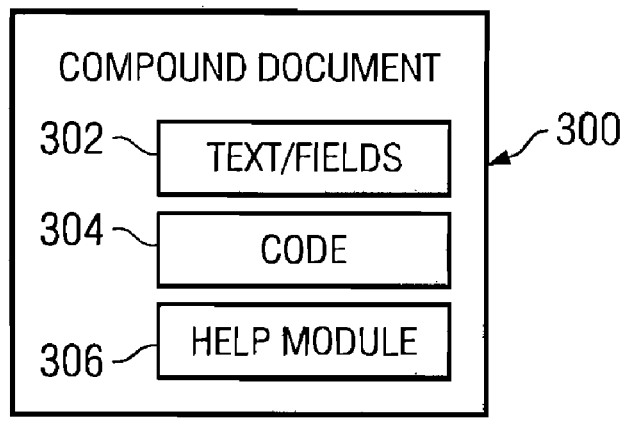
FIG. 3 is a block diagram of a compound document, in accordance with an illustrative embodiment.

FIG. 3 is a block diagram of a compound document, in accordance with an illustrative embodiment. Compound document 300 can be implemented using a data processing system, such as data processing system 100 shown in FIG. 1, or data processing system 200 shown in FIG. 2. Compound document 300 is associated with a processing application. The term "associated with" means that the processing application is designed to use, manipulate, or in some manner be used with compound document 300.

Compound document 300 includes three major components. The first major component is text/fields 302. Text/fields 302 is the text and/or the input fields present in compound document 300. Text/fields 302 is the portion of compound document 300 that is most readily visible to a user.

Compound document 300 also includes code 304. Code 304 can be any code which provides added functionality to compound document 300. For example, code 304 could be designed to manipulate how text/fields 302 are presented to the user. In another example, code 304 can be used to manipulate numbers input into fields of text/fields 302.

Compound document 300 also includes help module 306. Help module 306 is a collection of help information that is defined within compound document 300, and that applies specifically to compound document 300. Thus, help module 306 is often only useful with respect to the particular compound document, such as compound document 300.

Figure 4:
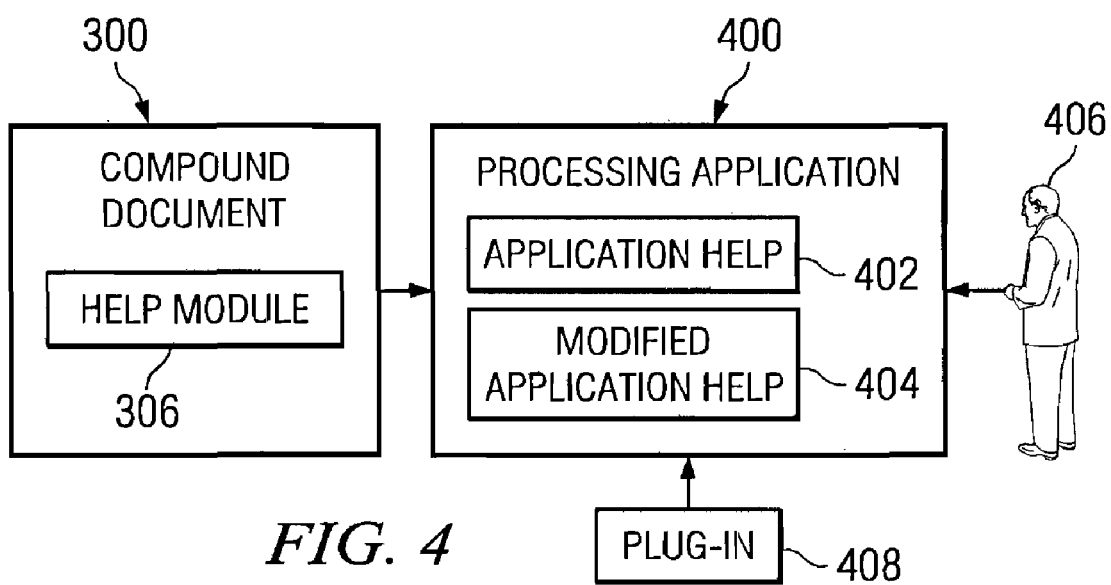
FIG. 4 is a block diagram representing a process of integration of a help module of a compound document into a processing application, in accordance with an illustrative embodiment.

FIG. 4 is a block diagram representing a process of integration of a help module of a compound document into a processing application, in accordance with an illustrative embodiment. The process shown with respect to FIG. 4 can be implemented in a data processing system, such as data processing system 100 shown in FIG. 1 or data processing system 200 shown in FIG. 2. The process shown with respect to FIG. 4 uses a compound document, such as compound document 300 shown in FIG. 3. In this illustrative example, compound document 300 and help module 306 in FIG. 4 correspond to compound document 300 and help module 306 in FIG. 3.

In the illustrative embodiment of FIG. 4, processing application 400 is being used to manipulate compound document 300. Additionally, help module 306 is integrated with application help 402. As a result, a modified application help 404 is created. When user 406 accesses a help function of processing application 400, user 406 will actually access modified application help 404.

In an illustrative embodiment, processing application 400 can integrate help module 306 into application help 402 at run-time, possibly even at the time that user 406 attempts to access application help 402. At the corresponding appropriate time, processing application 400 parses help module 306 and combines the resulting information with application help 402 to form modified application help 404. In this way, a single unified help system is created. Optionally, a plug-in or framework 408 can be used to perform the function of parsing and/or integrating help module 306 into application help 402.

In an illustrative embodiment, different information or portions of help module 306 can be integrated with different locations within application help 402. For example, application help 402 may contain four books: book 1, book 2, book 3 and book 4. In this example, help module 306 includes book A and book B.

Help module 306 can include code that specifies where processing application 400 or plug-in 408 is to place book A or book B within application help 402. The term "to place" refers to inserting a book from help module 306 in a particular location within application help 402, or to replace a particular portion of application help 402.

Thus, in a specific illustrative example, book A of help module 306 can be inserted between book 2 and book 3 of application help 402. Similarly, code can be provided such that processing application 400 or plug-in 408 will take book B from help module 306 and replace all or a portion of book 4 of application help 402.

Additional code or tags in a markup language can be used to further define how help module 306 is integrated with application help 402. For example, in a markup language, tags can be used to express concepts such as after last, before first, replace page, insert between and other commands.

The illustrative embodiments also allow for compilation of various help modules. For example, a single compound document may contain multiple distinct extensible markup language (XML) documents. Each of these extensible markup language (XML) documents might define one or more separate help modules. In this case, the processing application combines all the help modules associated with the five XML documents with the application help of the processing application, in order to deliver a single unified help system.

Figures 5, 6:
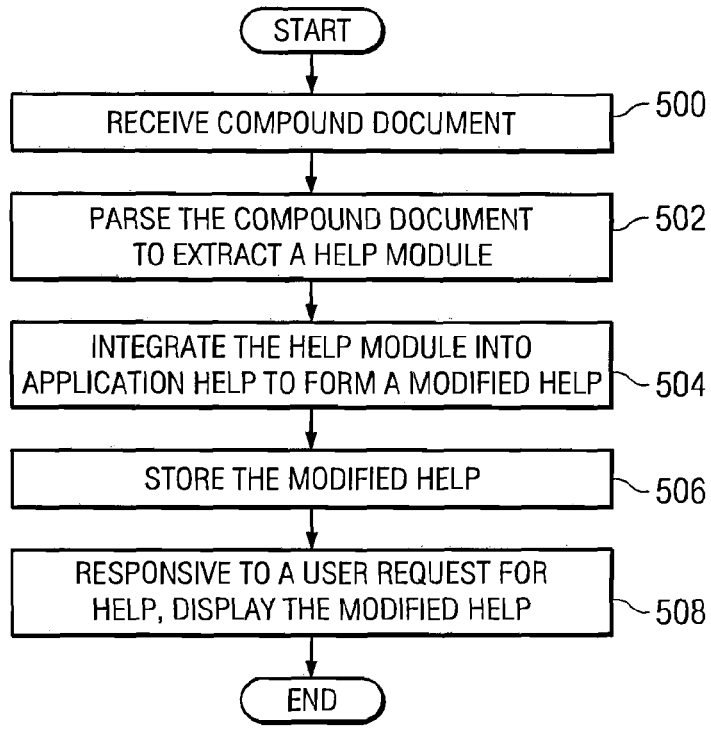
FIG. 5 is a flow chart of a process for integrating a help module with application help, in accordance with an illustrative embodiment.
FIG. 6 is pseudo code illustrating an exemplary structure of a help module in a compound document, in accordance with an illustrative embodiment.

FIG. 5 is a flow chart of a process for integrating a help module with application help, in accordance with an illustrative embodiment. The process shown in FIG. 5 can be implemented in a data processing system, such as data processing system 100 shown in FIG. 1 or data processing system 200 shown in FIG. 2. The process shown in FIG. 5 can be implemented with respect to a compound document, such as compound document 300 shown in FIG. 3 and FIG. 4, using a processing application such as processing application 400 shown in FIG. 4, or a plug-in such as plug-in 408 shown in FIG. 4.

The process begins as a data processing system receives a compound document (step 500). A processing application of the data processing system parses the compound document to extract a help module (step 502). Optionally, a plug-in associated with the processing application parses the compound document to extract the help module. Next, the application help or a plug-in associated with the application help integrates the help module into application help to form a modified help (step 504). The data processing system stores the modified help (step 506). The data processing system then, responsive to a user request for help, displays the modified help (step 508). The process terminates thereafter.

In this illustrative example, a help module is a first collection of information that applies specifically to the compound document. The compound document is associated with the processing application used to manipulate the compound document. The term "associated with" means that the compound document can be used by the processing application or that the processing application is necessary for use of, or manipulation of, the compound document.

Additionally, the application help comprises a second collection of help information that applies to the processing application. Thus, the first collection of help information is distinct from the second collection of help information.

By integrating the help module into the application help, a modified help is formed. The modified help comprises a combination of the first collection of help information and the second collection of help information. This modified help can be stored or displayed.

As part of the integration process, individual components of the help module can be placed into specific predetermined locations within the application help. A location is "predetermined" if that location is defined by either code associated with the help module or code associated with the processing application or application help. In either case, the code specifies the predetermined location within the application help.

FIG. 6 is pseudo code illustrating an exemplary structure of a help module in a compound document, in accordance with an illustrative embodiment. The pseudo code shown in FIG. 6 can be implemented in a data processing system, such as data processing system 100 shown in FIG. 1 or data processing system 200 shown in FIG. 2. The pseudo code shown in FIG. 6 can be specifically implemented in a compound document, such as compound document 300 shown in FIG. 3 and FIG. 4.

The pseudo code shown in FIG. 6 defines two pages, one a child of the other. Each page has a title, a delimited list of index terms that should apply, and page content. In this illustrative example, the pseudo code uses the nesting of XML tags to mirror the nesting of the pages that the tags should create. Additional tagging could be added to include other content or ideas, such as sub-titles, images, and so on.

FIG. 7 shows pseudo code that illustrates an exemplary method of integrating a portion of a help module into a specific place within application help, in accordance with an illustrative embodiment. The pseudo code shown in FIG. 7 can be implemented in a data processing system, such as data processing system 100 shown in FIG. 1 or data processing system 200 shown in FIG. 2. The pseudo code shown in FIG. 7 can be implemented in a compound document, such as compound document 300 shown in FIG. 3 and FIG. 4.

The pseudo code shown in FIG. 7 provides additional tagging that provides instructions on where to place various portions of help from a help module. Specifically, the pseudo code shown in FIG. 7 can be used to describe where to place information from a help module defined in the pseudo code in FIG. 6.

In this particular illustrative example, an anchor point, book 1, is defined. This pseudo code indicates that the help module should appear before book 1. This concept can be expanded further to drill down into a help system by using an array, or dotted notation, of books within an application help. For example, an array could be:

book 1 [2] [3] [4].

Book 1.child2.child3.child4.

In both cases, an indication is made that the application should locate book 1, find the second child of the book, then find the third child of the second child, then find the fourth child of the third child, then finally insert the help before the fourth child. These tags can also apply to the help page level so that pages can be interleaved from the help module with pages in the application help.

Other location tags may be used to express concepts such as after last, before last, replace page, insert at a particular line, and others. Thus, the illustrative embodiments allow for compilation of various help modules. Even if a single compound document contains multiple distinct XML documents, each associated with its own help module, the processing application can still combine all help modules with the application help to deliver a single unified help system.

FIG. 8 shows pseudo code that illustrates an exemplary method of integrating a portion of a help module into a specific place within application help, in accordance with an illustrative embodiment. The pseudo code shown in FIG. 8 can be implemented in a data processing system, such as data processing system 100 shown in FIG. 1 or data processing system 200 shown in FIG. 2. The pseudo code shown in FIG. 8 can be implemented in a compound document, such as compound document 300 shown in FIG. 3 and FIG. 4.

Specifically, the pseudo code of FIG. 8 provides an example in which location tags may be placed on specific pages within the document help, but in which pages without such tags would inherit the general setting. In the pseudo code of FIG. 8, the general location is set after the <documenthelp> tag to be "before book1." The first help page in the help module does not have a location setting, so the first help page inherits the general setting. However, the second help page has its own setting, "after book 3." Thus, the second page page is placed after book 3.

Thus, the illustrative embodiments provide for a computer-implemented method, computer program product, and data processing system for integrating help functions. A compound document is received. The compound document comprises a help module. The help module comprises a first collection of help information that applies specifically to the compound document. The compound document is associated with a processing application used to manipulate the compound document. The processing application comprises application help. The application help comprises a second collection of help information that applies to the processing application. The first collection of help information is distinct from the second collection of help information. The method also includes integrating the help module into the application help to form a modified help. The modified help comprises a combination of the first collection of help information and the second collection of help information. The modified help can be stored or displayed.

The invention can take the form of an entirely hardware embodiment, an entirely software embodiment or an embodiment containing both hardware and software elements. In a preferred embodiment, the invention is implemented in software, which includes, but is not limited, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for integrating help functions, the computer-implemented method comprising:
receiving a compound document comprising a help module, wherein the help module comprises a first collection of help information that applies specifically to the compound document, wherein the compound document is associated with a processing application used to manipulate the compound document, wherein the processing application comprises application help, wherein the application help comprises a second collection of help information that applies to the processing application, and wherein the first collection of help information is distinct from the second collection of help information;
integrating the help module into the application help to form a modified help, wherein the modified help comprises a combination of the first collection of help information and the second collection of help information; and
storing the modified help.

2. The computer-implemented method of claim 1 wherein the help module is written in a markup language, and wherein the computer-implemented method further comprises:
parsing the compound document to extract the help module.

3. The computer-implemented method of claim 2 wherein the processing application performs parsing and integrating.

4. The computer-implemented method of claim 2 wherein a plug-in module associated with the processing application performs parsing and integrating.

5. The computer-implemented method of claim 2 wherein parsing and integrating are performed during runtime by the processing application when the compound document is opened with the processing application.

6. The computer-implemented method of claim 1 further comprising:

responsive to a user request for help relating to the compound document, displaying the modified help.

7. The computer-implemented method of claim 1 wherein the help module comprises a first book comprising a first part of the first collection of help information, and wherein the computer-implemented method further comprises:
   as part of integrating, placing the first book into the application help at a pre-determined location.

8. The computer-implemented method of claim 7 wherein the pre-determined location is specified by code contained within the help module.

9. The computer-implemented method of claim 7 wherein the pre-determined location comprises a location associated with a second book, wherein the second book is associated only with the application help.

10. The computer-implemented method of claim 9 wherein the pre-determined location comprises a location between the second book and a third book associated only with the application help.

11. The computer-implemented method of claim 7 wherein placing comprises one of inserting the first book before the pre-determined location, inserting the first book after the pre-determined location, inserting a specific portion of the first book at the predetermined location, wherein the specific portion is less than all of the first book, and replacing a part of the second collection of information, wherein the part comprises information associated with the pre-determined location.

12. The computer-implemented method of claim 7 wherein the help module further comprises a second book comprising a second part of the first collection of help information, and wherein the computer-implemented method further comprises:
   as part of integrating, placing the second book into the application help at a second pre-determined location, and wherein the second pre-determined location is different than the pre-determined location.

13. A non-transitory, recordable-type medium having computer program instructions for integrating help functions, the computer program instructions comprising:
   instructions for receiving a compound document comprising a help module, wherein the help module comprises a first collection of help information that applies specifically to the compound document, wherein the compound document is associated with a processing application used to manipulate the compound document, wherein the processing application comprises application help, wherein the application help comprises a second collection of help information that applies to the processing application, and wherein the first collection of help information is distinct from the second collection of help information; and
   instructions for integrating the help module into the application help to form a modified help, wherein the modified help comprises a combination of the first collection of help information and the second collection of help information.

14. The non-transitory, recordable-type medium of claim 13 wherein the help module is written in a markup language, and wherein the computer program instructions further comprises:
   instructions for parsing the compound document to extract the help module, wherein the processing application performs parsing and integrating.

15. The non-transitory, recordable-type medium of claim 13 wherein the computer program instructions further comprises:
   instructions for, responsive to a user request for help relating to the compound document, displaying the modified help.

16. The non-transitory, recordable-type medium of claim 13 wherein the help module comprises a first book comprising a first part of the first collection of help information, and wherein the computer program instructions further comprises:
   instructions for, as part of integrating, placing the first book into the application help at a pre-determined location.

17. The non-transitory, recordable type medium of claim 16 wherein the pre-determined location comprises a location associated with a second book, wherein the second book is associated only with the application help.

18. The non-transitory, recordable type medium of claim 16 wherein placing comprises one of inserting the first book before the pre-determined location, inserting the first book after the pre-determined location, inserting a specific portion of the first book at the predetermined location, wherein the specific portion is less than all of the first book, and replacing a part of the second collection of information, wherein the part comprises information associated with the pre-determined location.

19. A data processing system comprising:
   a bus;
   a memory connected to the bus, wherein the memory contains a set of instructions for integrating help functions; and
   a processor connected to the bus, wherein the processor is operable to execute the set of instructions to:
   receive a compound document comprising a help module, wherein the help module comprises a first collection of help information that applies specifically to the compound document, wherein the compound document is associated with a processing application used to manipulate the compound document, wherein the processing application comprises application help, wherein the application help comprises a second collection of help information that applies to the processing application, and wherein the first collection of help information is distinct from the second collection of help information; and
   integrate the help module into the application help to form a modified help, wherein the modified help comprises a combination of the first collection of help information and the second collection of help information.

20. The data processing system of claim 19 wherein the help module is written in a markup language, and wherein the processor is operable to further execute the instructions to:
   parse the compound document to extract the help module, wherein the processing application performs parsing and integrating.

21. The data processing system of claim 19 wherein the processor is operable to further execute the instructions to:
   responsive to a user request for help relating to the compound document, display the modified help.

22. The data processing system of claim 19 wherein the help module comprises a first book comprising a first part of the first collection of help information, and wherein the processor is operable to further execute the instructions to:
   as part of integrating, place the first book into the application help at a pre-determined location.

23. The data processing system of claim 22 wherein the pre-determined location comprises a location associated with a second book, wherein the second book is associated only with the application help.

24. The data processing system of claim 22 wherein placing comprises one of inserting the first book before the pre-determined location, inserting the first book after the pre-determined location, inserting a specific portion of the first book at the predetermined location, wherein the specific portion is less than all of the first book, and replacing a part of the second collection of information, wherein the part comprises information associated with the pre-determined location.

25. The computer implemented method of claim 1 wherein, in addition to the help module, the compound document also comprises a text or field component configured for visibility to a user, and wherein the compound document also comprises code that provides functionality with respect to the compound document that is in addition to any functionality provided by the processing application.

* * * * *